(No Model.)

S. ROLFE.
EXPLOSION ENGINE.

No. 597,860.

Patented Jan. 25, 1898.

Witnesses

Inventor

UNITED STATES PATENT OFFICE.

SPENCER ROLFE, OF TEDDINGTON, ENGLAND, ASSIGNOR OF ONE-HALF TO FREDERICK HORNBY, OF BOSCOMBE, ENGLAND.

EXPLOSION-ENGINE.

SPECIFICATION forming part of Letters Patent No. 597,860, dated January 25, 1898.

Application filed March 13, 1897. Serial No. 627,332. (No model.)

*To all whom it may concern:*

Be it known that I, SPENCER ROLFE, a subject of the Queen of Great Britain, residing at Teddington, England, have invented new and useful Improvements in and Connected with Explosion-Engines, of which the following is a specification.

My invention relates to motors or engines worked by explosive mixtures, and has for its object to utilize the heat developed by the explosions to convert water into steam, whereby the power of such motors is increased, the action of the motive fluid on the piston or pistons is prolonged, the said motive fluid works expansively, the action of the motors is positive, more continuous and perfect, and less injurious to the mechanism, the successive explosions behind the piston are effected automatically, and water-jackets or other external means heretofore employed to carry away the excess of heat generated by the explosion of the charge are dispensed with.

In order that my invention may be clearly understood and readily carried into effect, I will describe the same with reference to the accompanying drawings, in which—

Figure 1:
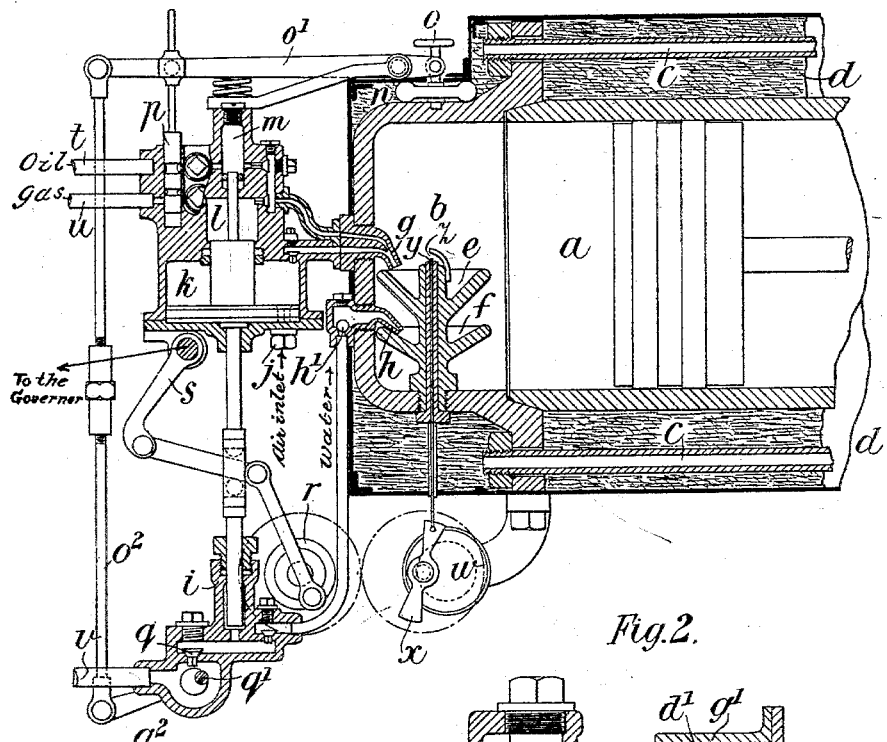
Figure 2:
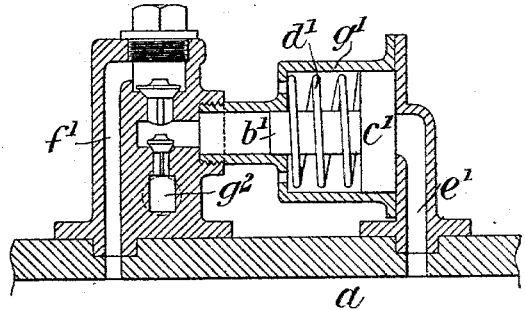
Figure 3:
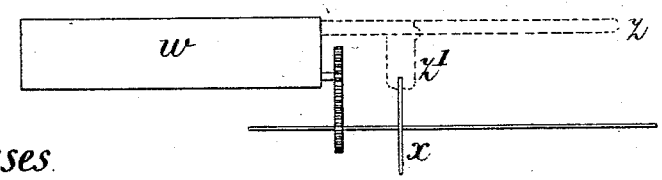

Figure 1 is a vertical section of a portion of a motor constructed according to my invention. Fig. 2 is a section of an automatic injector for water, hydrocarbon, or lubricant which I employ in conjunction with my motor. Fig. 3 is a diagrammatic view of my improved system of ignition, showing a different manner of driving the interrupter.

In Fig. 1, $a$ is the cylinder, which I by preference form of weldless steel tube.

$b$ is the ignition-chamber, also preferably of steel and held in position against the cylinder by tubular steel bolts $c\,c$. When a single-action engine is employed, a ring of steel (not shown in the drawings) is provided at the end of the cylinder to serve as an attachment for the tubular bolts.

The cylinder, ignition-chamber, and bolts are surrounded by non-conducting material $d$, not only to conserve the heat generated by the successive explosions, but also to maintain a uniform temperature between the cylinder parts and the bolts $c$, thus insuring the equal expansion of the whole.

The vaporizer consists of a stem carrying an annular receptacle $e$ for the reception of fluid hydrocarbon and for heating the charge and a receptacle $f$ for receiving and vaporizing the water. The ignition device passes through and is secured to the said vaporizer, as hereinafter described.

$g$ is the nozzle of the injecting arrangement, hereinafter described and which in the drawings is shown compound, but which may be simple. The nozzle may be provided with a back-pressure valve near its orifice, and through this nozzle air and gas or a suitable hydrocarbon or all three are introduced.

$h$ is the jet or nozzle, through which water is introduced and which in the drawings is shown with a back-pressure valve $h'$ attached.

$i$ is a plunger-pump for introducing water.

$j$ is the air-inlet of my compound injecting arrangement, which consists of the cylinder $k$ for air, the cylinder $l$ for coal or other suitable gas, and a cylinder $m$ for the hydrocarbon. The cross-sectional areas of these cylinders are such that the proper relative proportions of air, gas, and hydrocarbon for insuring perfect combustion are introduced into the ignition-chamber. The inlet and outlet valves of these cylinders are of the ordinary form and may be held upon their seats by springs, if necessary.

$n$ is a device for regulating the heat, the said device being formed of a chamber similar to that of an aneroid barometer, and is preferably of steel and filled with oil, glycerin, or fusible metal.

$o$ is an adjusting-screw in connection with a multiplying-lever $o'$, which in the drawings is shown single, but which may be compound, if desired.

$p$ is a cylindrical valve which controls by the action of the heat-regulator, through the medium of the said multiplying-lever $o'$, the admission of gas or hydrocarbon.

The water-admission valve $q$ is attached to and controlled by the heat-regulator, as clearly shown in the drawings, by means of a cam $q'$, connected to the arm $q^2$, which is operated by the rod $o^2$ through the medium of the multiplying lever $o'$.

$r$ is a crank-disk actuated from the crankshaft, the said crank-disk being caused to make one or more revolutions for each revolution of the main shaft.

$s$ is a rocking-lever actuated by the governor, a partial revolution causing the movement of the pistons or plungers in all the cylinders to vary from their maximum to their minimum.

$t$ is the tube conveying the hydrocarbon from the reservoir.

$u$ is the tube conveying gas from the main or from a suitable receptacle in which it is stored under pressure.

$v$ is a pipe from the water-supply or for conveying heated water from a condenser.

$w$ is an induction-machine of any suitable construction for generating electricity, the said machine being preferably on Varley's principle and the driving-spindle of which passes out through a stuffing-box and an inner receptacle containing quicklime.

$x$ is an interrupter, hereinafter described.

$y$ is one terminal of my igniter, which consists of a rod of porcelain, asbestos, or other suitable material, through which passes a wire which extends through the stem of the vaporizer and to which one pole of the electrical machine is connected, the vaporizer $e$ being connected to the other pole, so that the igniting-spark passes at $z$.

The inductor $w$ and the interrupter $x$ are shown as driven from the shaft $r$ and as arranged to cause a spark to pass twice for each injection into the main cylinder, the extra ignition being intended for a supplementary charge introduced by the arrangement shown in Fig. 2 and hereinafter described. In Fig. 3, which is a diagrammatic view, I have shown how the interrupter may be driven to make any desired number of revolutions by means of suitable gearing, the interrupter being in this instance mounted on a shaft separate from that of the induction-machine. The dotted lines in this figure represent the course of the current.

The operation of the motor is as follows: The valve $p$ being in the position for admitting a charge of gas, the starting-lever of the motor is operated so as to cause the piston (which is at or near the back or bottom end of the cylinder) to force in a charge of gas and air, which is then exploded by the sparks. The motor being thus started works continuously, using a mixture of gas and air as the motive fluid. As the internal heat increases the heat-regulator $n$ is expanded, and at a predetermined temperature the gas is replaced, by the movement of the valve $p$, by the hydrocarbon, which I use, preferably, in the form of ordinary paraffin-oil. The heat still continuing to rise, the cam $q'$ permits the pump suction-valve $q$ to fall onto its seating, and water is delivered through the nozzle $h$ and is immediately vaporized in the receptacle $f$ by the vaporizer. This sudden conversion of water into steam, while reducing the internal temperature, follows upon and continues the action of the explosion upon the piston. Ultimately the regulating-gear will take up such a position that the quantity of water introduced will be such as by its vaporization absorbs the excess of heat and maintains a predetermined temperature within the cylinder, the whole of the heat generated being then, with but small loss, transformed into work.

The arrangement shown in vertical section in Fig. 2 is designed, as above mentioned, to introduce or inject a charge of hydrocarbon into the cylinder of the motor after each main explosion, the explosion of this charge of hydrocarbon serving to prolong the main explosion or to supplement it, sufficient air having been introduced for this purpose. It consists of a differential plunger $b'\ c'$, working in a cylinder $g'$, at one end of which it is normally held by the spring $d'$, which is of such strength as to be unaffected by the compression of the charge before ignition. $e'$ is a free passage from the engine-cylinder, the said passage $e'$ opening into the injector-cylinder $g'$ behind the larger plunger $c'$. $f'$ is the discharge-passage, and the passage $g^2$ communicates with the supply of hydrocarbon. The arrangement operates as follows: The pressure in the passage $e'$ forces a charge of fluid through $f'$, the apparatus being recharged by the backward movement of the plungers $b'\ c'$, due to the spring, while the exhaust is open. An adjusting-screw can be so placed as to limit the movement of the plunger and thereby the quantity of fluid delivered. My injection apparatus (shown in Fig. 2) can also be used for injecting water for the purpose described with reference to Fig. 1, or, if required, for injecting a lubricant. It will thus be seen that the object of this appliance is threefold: first, to inject hydrocarbon to lengthen the explosion or to effect a supplementary explosion, as above described; secondly, to inject water to absorb the internal heat, and, thirdly, to increase the power of the motor by the vaporization of the liquid injected and also to introduce lubricant as an automatic lubricator.

In my improved system of electrical ignition I employ an interrupted short circuit, as shown in Figs. 1 and 3, in which $w$ is the induction-machine. $z$ shows where the circuit is interrupted for the passage of the igniting-spark. $z'$ is the short circuit, the distance for the passage of the spark in which is less than at $z$. $x$ is the interrupter, the solid portion or portions of which interrupt the spark normally passing at $z'$ and cause it to pass at $z$, thereby exploding the charge.

The exhaust of Fig. 1 is of ordinary construction, the exhausted gases preferably passing through a condenser. (Not shown in the figure.)

Having now particularly described and ascertained the nature of my said invention and in what manner the same is to be performed, I declare that what I claim is—

1. In an explosive-engine the combination with the cylinder of an ignition-chamber formed separately therefrom, tubular bolts securing said chamber to said cylinder and an inclosing casing of non-heat-conducting material surrounding said cylinder-chamber and bolts, to secure the uniform expansion of said parts, substantially as described.

2. In an explosive-engine, the combination with the cylinder, of an ignition-chamber communicating therewith, and provided with an igniting device, a vaporizer in said ignition-chamber, consisting of a heat-conducting material, provided with a receptacle for water, means for supplying an explosive compound to said ignition-chamber and means for supplying water to said receptacle, substantially as described.

3. In an explosive-engine, the combination with the cylinder, of an ignition-chamber communicating therewith, and provided with an igniting device, a vaporizing device in said chamber provided with a receptacle for hydrocarbon fluid, and a receptacle for water and independent means for supplying a hydrocarbon fluid and water to said receptacles substantially as described.

4. In an explosive-engine, the combination with the cylinder, of an ignition-chamber communicating therewith and provided with an igniting device, a vaporizing device in said chamber formed of heat-conducting material, provided with a receptacle for hydrocarbon fluid and a separate receptacle for water, independent means for supplying hydrocarbon fluid and water to said receptacles, and a controlling device having an expansible part connected with said ignition-chamber, and provided with valves for controlling the admission of hydrocarbon fluid and oil, substantially as described.

5. In an explosive-engine, the combination with the cylinder, of an ignition-chamber communicating therewith and provided with an igniting device, a multiple pump, provided with separate pistons and cylinders for forcing air, hydrocarbon fluid and gas into said ignition-chamber, said pistons and cylinders having their areas proportioned relatively to the amounts of air hydrocarbon fluid and gas, required for the explosive mixture, substantially as described.

6. In an explosive-engine, the combination with the cylinder and the ignition-chamber provided with an igniting device, of a pump provided with three cylinders and pistons communicating with said ignition-chamber, for delivering air, gas and explosive fluid thereto, said pistons and cylinders being proportioned relatively to the amounts of air gas and explosive fluid required in each charge for said chamber, controlling-valves for controlling the supply of gas and fluid to said pump, and a thermal regulator connected with said chamber and controlling said valves, substantially as described.

7. In an explosive-engine, the combination with the cylinder, the ignition-chamber and igniting device therefor, of a multiple pump provided with three separate cylinders and pistons communicating with said chamber, said pistons and cylinders being proportioned relatively to the amounts of air, gas and explosive fluid required for each charge of said chamber, means for supplying air, gas and explosive fluid to said cylinders respectively, means for forcing water into said chamber, controlling-valves for the gas, explosive fluid and water-supply, and a thermal regulator connected with said chamber, and provided with devices for actuating said controlling-valves, substantially as described.

8. In an explosive-engine, the combination with the cylinder, ignition-chamber and igniter therefor, of a pump provided with separate pistons and cylinders for forcing air and an explosive material into said chamber, a pump for forcing water into said chamber, a driving means for said pumps, including a reciprocating part engaging a lever having a movable engagement with the pump-rod, and a connection between said lever and the engine-governor for varying relative positions of said lever and pump-rod, to vary the movements of said pumps, substantially as described.

9. In an explosive-engine, the combination with the cylinder, ignition-chamber and igniter therefor, of a vaporizer in said chamber consisting of heat-conducting material, provided with a receptacle for an explosive fluid and a separate receptacle for water, a movable ignition-rod extending longitudinally through said vaporizer into said chamber, an electric generating device outside of said chamber, and an interrupter interposed between said generator and said rod, and means for driving said interrupter and generator from the engine, substantially as described.

10. In an explosive-engine, the combination with the cylinder, ignition-chamber and igniting device, of means for supplying an explosive material to said chamber, means for supplying water to said chamber to take up the surplus heat in said chamber and cylinder, and a casing of non-heat-conducting material surrounding said cylinder and chamber to conserve the heat generated therein and secure the equal expansion of the parts, substantially as described.

11. In an explosive-engine, the combination with the cylinder, igniting-chamber and the igniter therefor, of means for supplying an explosive compound to said ignition-chamber, and a device operated by the explosion in said ignition-chamber, for forcing an additional amount of explosive material into the cylinder after the explosion to prolong the action thereof, substantially as described.

SPENCER ROLFE.

Witnesses:
G. F. REDFERN,
JOHN E. BOUSFIELD.